(12) United States Patent
Martin et al.

(10) Patent No.: US 12,248,531 B2
(45) Date of Patent: Mar. 11, 2025

(54) DIGITAL VIDEO VIRTUAL CONCIERGE USER INTERFACE SYSTEM

(71) Applicant: Rodd Martin, Sydney (AU)

(72) Inventors: Rodd Martin, Sydney (AU); Alistair De Blacquiere-Clarkson, Sydney (AU)

(73) Assignee: Rodd Martin, Elanora Heights (AU)

( * ) Notice: Subject to any disclaimer, the term of this patent is extended or adjusted under 35 U.S.C. 154(b) by 0 days.

(21) Appl. No.: 18/557,114

(22) PCT Filed: Apr. 12, 2022

(86) PCT No.: PCT/AU2022/050324
§ 371 (c)(1),
(2) Date: Oct. 25, 2023

(87) PCT Pub. No.: WO2022/226577
PCT Pub. Date: Nov. 3, 2022

(65) Prior Publication Data
US 2024/0220564 A1    Jul. 4, 2024

(30) Foreign Application Priority Data
Apr. 26, 2021   (AU) ............................... 2021901228

(51) Int. Cl.
*G06F 16/957*  (2019.01)
*G10L 13/08*   (2013.01)
*G10L 15/26*   (2006.01)

(52) U.S. Cl.
CPC .......... *G06F 16/9577* (2019.01); *G10L 13/08* (2013.01); *G10L 15/26* (2013.01)

(58) Field of Classification Search
CPC ........ G06F 16/9577; G06F 9/453; G06F 3/16; G06F 3/167; G06F 16/44; G10L 13/08;
(Continued)

(56) References Cited

U.S. PATENT DOCUMENTS

2018/0295424 A1   10/2018   Taylor et al.
2018/0329722 A1   11/2018   Nguyen et al.
(Continued)

OTHER PUBLICATIONS

International Preliminary Report on Patentability (CH. II) dated Jun. 2, 2023 from PCT Application No. PCT/AU2022/050324.
(Continued)

*Primary Examiner* — Angie Badawi
(74) *Attorney, Agent, or Firm* — INNOVATION CAPITAL LAW GROUP, LLP; Vic Lin (57) ABSTRACT

There is provided herein a digital video virtual concierge user interface system which dynamically generates a series of user interface screens which the guide users through online application processes with dynamically generated audio and/or video content. The server generates the user interface along a process path defining user interface definitions. A user interface controller steps through the path to generate a user interface screen for each step according to the respective user interface definition thereof and a personalisation controller extracts customer data from a customer database according to a customer identifier and generates personalised content derived from the customer data so that the user interface controller generates at least one user interface screen in accordance with the personalised content.

33 Claims, 7 Drawing Sheets (58) Field of Classification Search
CPC ....... G10L 15/26; G10L 13/027; G10L 15/22;
G06N 20/00; G06Q 10/10; G06Q
30/0641; G06Q 40/08; G06Q 30/01;
G06Q 30/0621
See application file for complete search history.

(56) References Cited

U.S. PATENT DOCUMENTS

| | | |
|---|---|---|
| 2019/0045252 A1 | 2/2019 | Lyons et al. |
| 2019/0141382 A1 | 5/2019 | Kageyama et al. |
| 2020/0074182 A1 | 3/2020 | Chang et al. |
| 2021/0089779 A1 | 3/2021 | Chan et al. |
| 2021/0303826 A1* | 9/2021 | Voss .................. H04N 21/4302 |
| 2022/0046313 A1 | 2/2022 | Harshawat et al. |
| 2022/0070515 A1 | 3/2022 | Manchanda et al. |
| 2023/0229465 A1* | 7/2023 | Singh .................... G06F 3/0482 |
| | | 715/709 |
| 2024/0038277 A1* | 2/2024 | Robert Jose ......... G11B 27/005 |

OTHER PUBLICATIONS

International Search Report & Written Opinion dated Jun. 21, 2022 from PCT Application No. PCT/AU2022/050324.

Written Opinion of the IPEA dated Mar. 17, 2023 from PCT Application No. PCT/AU2022/050324.

* cited by examiner

DIGITAL VIDEO VIRTUAL CONCIERGE USER INTERFACE SYSTEM

FIELD OF THE INVENTION

This invention relates generally to dynamic user interface generation and, more particularly, to digital video virtual concierge user interface system.

BACKGROUND

Various techniques of dynamically generating consumer interfaces exist including US 2018/0295424 A1 (AMAZON TECHNOLOGIES, INC.) 11 Oct. 2018 which discloses techniques for providing interactive electronic commerce functionality via graphical overlays on live streaming video.

US 2018/0329722 A1 (ACCENTURE GLOBAL SOLUTIONS LIMITED) 15 Nov. 2018 discloses ways of generating a dynamic user interface and playing a video within the dynamic user interface.

US 2020/0074182 A1 (SECOND SPECTRUM, INC.) 5 Mar. 2020 on the other hand discloses enhancing video content includes by processing at least one video feed through at least one spatiotemporal pattern recognition algorithm that uses machine learning to develop an understanding of a plurality of events and to determine at least one event type for each of the plurality of events.

US 2019/0045252 A1 (MORA GLOBAL, INC.) 7 Feb. 2019 yet further discloses personalising media content using personalisation digital media templates that can be retrieved that designate particular types of media content to be combined with particular preselected digital video files and particular times within particular preselected digital video files at which the particular types of media content are to be combined with the particular preselected digital video files. The particular times are relative to the times within the preselected digital video files at which emotionally impactful moments occur.

SUMMARY OF THE DISCLOSURE

There is provided herein a digital video virtual concierge user interface system which dynamically generates a series of user interface screens which the guide users through online application processes with dynamically generated audio and/or video content.

The system comprises a server generating the user interface. The server comprises at least one process defining at least one path, the path defining a plurality of user interface definitions and a database of a plurality of video files for at least a subset of the user interface screens. A processor of the server executes computer program code instructions controllers comprising a user interface controller to step through the path and to generate a user interface screen for each step according to the respective user interface definition thereof, wherein at least one user interface screen comprises an associated video file embedded therein.

The processor further executes a personalisation controller which extracts customer data from a customer database according to a customer identifier and which generates personalised content derived from the customer data and wherein the user interface controller generates at least one user interface screen in accordance with the personalised content.

The processor further executes a data capture controller which captures and stores user input data input via form elements of at least one of user interface screen.

The at least one process may define a branching of more than one path and wherein the user interface controller may be configured to branch to a path according to the user input data.

For each user interface screen, the user interface controller may automatically commences playing of the associated video file.

The video file embedded within the at least one user interface screen may comprise a video of a human which may be displayed and associated speech which may be played and which relates to information displayed on the associate user interface screen.

The personalisation controller may generate the personalised content on-the-fly in substantial real-time.

The personalisation controller may select pre-recorded content from the database in accordance with parameters derived from the customer data.

The personalised content may be personalised video data generated by the personalisation controller.

The generation of the personalised video data may comprise overlay text within the video data which may be derived from the customer data.

The personalisation controller may modify the video file embedded within the at least one user interface screen to overlay the text thereon.

The personalised content may be speech data synthesised by the personalisation controller.

The speech data may be derived from the customer data.

The speech data may be derived from text of the customer data.

The speech data may be synthesised from a numeric string derived from the customer data.

The speech data may be derived from categorisations of the customer data.

The speech data may be synthesised according to HTML request variables received from the interface.

The personalisation controller may insert the speech data into audio data of the associated video file.

The associated video file may comprise a placeholder specified by meta data thereof and wherein the personalisation controller inserts the speech data to address the placeholder specified by the meta data.

The personalisation controller may modify form input elements of at least one user interface screen.

The computer program code instruction controllers may further comprise a speech recognition controller which converts captured user speech audio to text.

The data capture controller may further capture and stores the text.

The controllers may further comprise an artificial intelligence controller comprising a trained machine optimised by a machine learning algorithm trained using historical user input data and wherein the trained machine may be configured to output at least one of a process path selection and a user interface screen modification.

The server may be in operable communication with a content database and wherein the server transmits request parameters to the content database and receives personalised content selected therefrom.

The speech data may be generated by speech synthesiser and wherein the speech data may be stored in the content database which are accessed as a media source by the interface.

The user interface may transmit HTML request parameters to the server which are used to identify the customer.

The HTML request parameters may be URL get request parameters.

The user interface may transmit the input data to the server and receives user interface updates from the server without refreshing the web page.

The user interface may be embedded within a web page served by third-party web server.

The interface may be embedded within the webpage as an iFrame.

The user interface may display a plurality of user interface screens without refreshing the web page.

The server may authenticate with the customer database to obtain the customer data from the customer database.

The server may transmit the user input data to the customer database for updating the customer data.

The server may communicate with the customer database via an intermediary interface.

The intermediary interface may authenticates with the CRM and may be configured with a set of authorised customer data fields accessible by the server.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1:
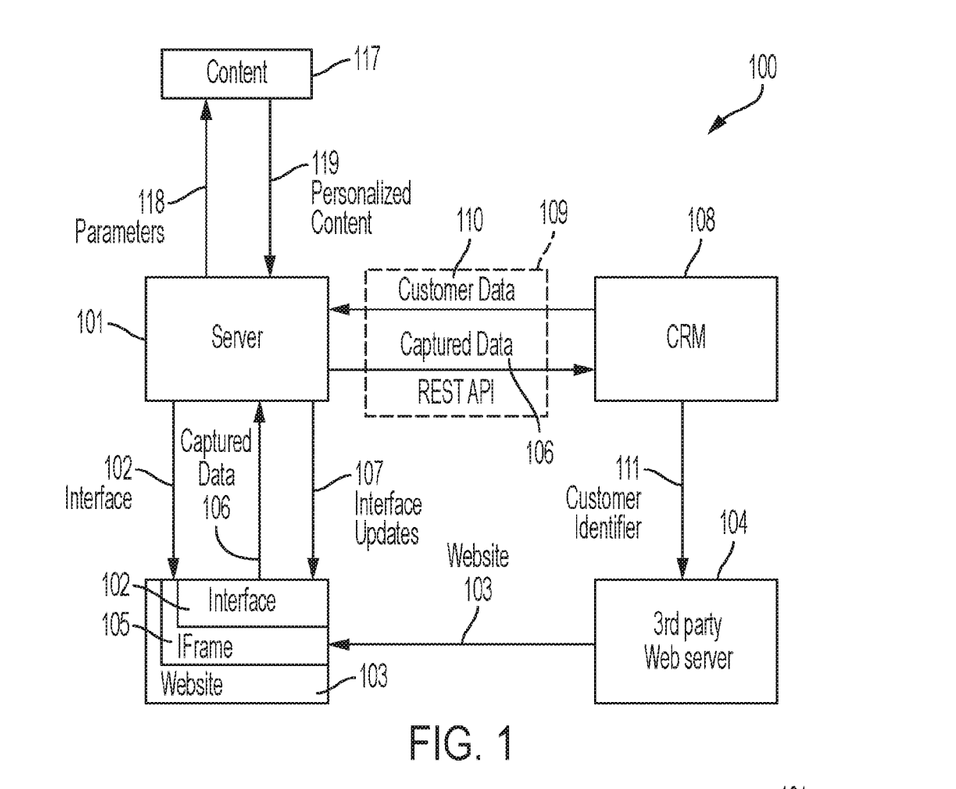
FIG. 1 shows a functional schematic of a digital video visual concierge user interface system in accordance with an embodiment.

FIG. 1 shows a functional schematic of a digital video visual concierge user interface system 100 in accordance with an embodiment. The system 100 comprises a server 101 configured to control a user interface 102. In the specific embodiment shown, the user interface is displayed on a website 103 served by third-party Web server 104.

In accordance with this embodiment, the website 103 may be embedded in an iFrame 105 which requests the interface 102 from the server 101.

The interface 102 may capture data which is transmitted as captured data 106 to the server 101 and the server 101 may update the user interface 102 with interface updates 107 accordingly.

In embodiments, the interface 102 may execute client-side code which can transmit the captured data 106 and receive user interface updates 107 without refreshing the page. The client-side code may listen for web socket broadcasts from the server 101 for updating the user interface 102.

In alternative embodiments, the user interface 102 may use conventional HTML redirects to update the interface 102 through a series of refreshes. Each redirect URL may comprise GET request parameters which may be used by the server 101 to configure the user interface accordingly 102.

The server 102 may be in operable communication with a customer database 108. The server 108 may communicate with the customer database 108 via a REST API 109. The server 101 may request customer data 110 from the customer database 108 and transmit the capture data 106 to the customer database.

Third-party web server 104 may request the interface 102 from the server 101 in accordance with a customer identifier 111, which may be used by the server 101 to select the appropriate customer data 110 from the customer database 110.

The server 101 may be in operable communication with a content database 117. The server 101 may transmit parameters 118 to the content database 117 and receive personalised content 119 selected therefrom.

In an embodiment, the personalised content 119 is selected from the content database 117 in accordance with the parameters 118. For example, the personalised content 119 may comprise a video file selected from the content database 117 in accordance with a parameter 118.

The personalised content 119 may further comprise personalised audio data. For example, the parameters 118 may comprise a numeric string wherein the content server 117 converts the numeric string to natural sounding speech. In a preferred embodiment, the content database 117 comprises recordings of numeric digits which are assembled according to the numeric string parameter 118.

Figure 2:
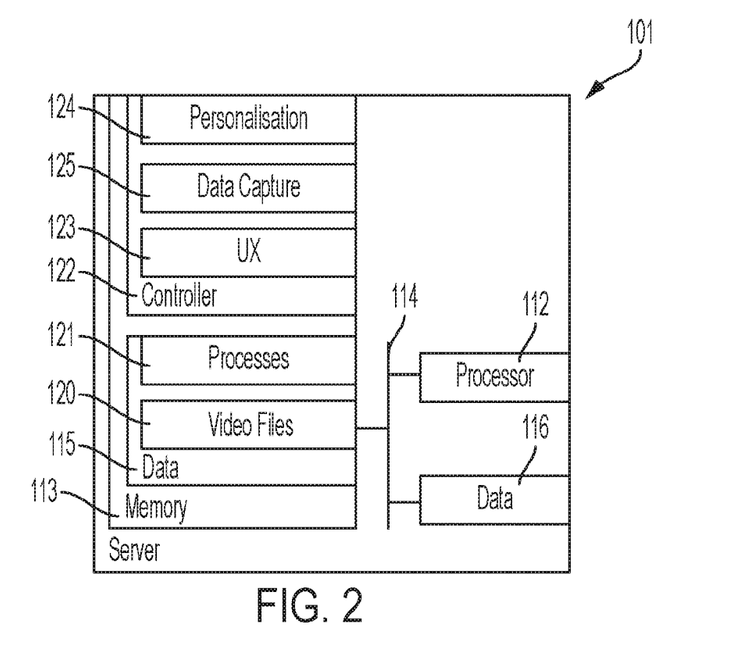
FIG. 2 shows a server of the system in further detail in accordance with an embodiment.

FIG. 2 shows the server 101 in further detail in accordance with an embodiment. The server 101 comprises a processor 112 for processing digital data. A memory device 113 storing digital data and computer program code instructions is in operable communication with the processor 112 via system bus 114. In use, the processor 112 fetches these computer program code instructions and associated data 115 for interpretation and execution of the computational functionality described herein.

The server 101 may comprise a data interface 116 for sending and receiving data across a wide area network and for communicating with the customer database 108 and client devices 135 having browser applications displaying the interface 102.

The data 115 may comprise a plurality of video files 120.

The data 115 may further comprise at least one process 121 defining at least one path. Each path may define at least one user interface definition, such as in HTML format.

The computer program code instructions may be logically divided into a plurality of computer program code instruction controllers 122. The controllers 122 may comprise a user interface controller 123 which is programmed to step through a path and to generate a user interface screen for each step according to a respective user interface definition thereof. The user interface controller 123 may further embed the video files 120 within the user interface screens.

The controllers 122 may further comprise a personalisation controller 124 which extracts customer data 110 from the customer database 108 according to the customer identifier 111 and which generates personalised content accordingly. The user interface controller 123 then generates the user interface screens using the personalised content. As alluded to above, the personalisation controller 124 may select personalised content 119 from the content database 117. Alternatively, the personalisation controller 124 may dynamically generate personalised content in substantial real-time.

The controllers 122 may further comprise a data capture controller 125 which captures and stores user input data input via form elements of the user interface screens.

In embodiments, the controllers 122 may comprise speech recognition controller to convert captured user speech audio to text.

In embodiments, a process may define a branch of more than one path and the user interface controller 123 is configured to branch to a path according to the user input data.

In further embodiments, the controllers 122 may comprise an artificial intelligence controller which is used to control path branching and/or the generation of personalised content. The artificial intelligence controller may comprise a trained machine which receives user input and outputs a path branch, personalised content identifier or user interface screen modification. The trained machine may be optimised by a machine learning algorithm which trains on historical user input data and a training data.

Figure 3:
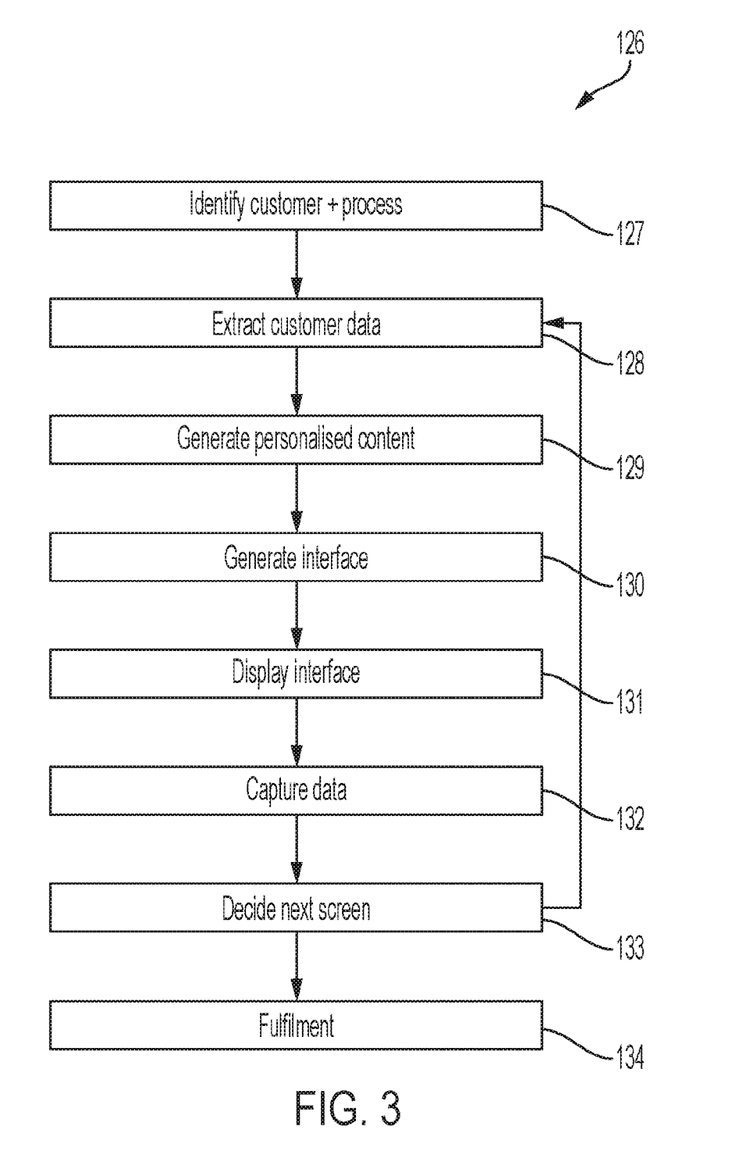
FIG. 3 shows exemplary processing of the system in accordance with an embodiment.

FIG. 3 shows exemplary processing 126 by the system 100. The processing 126 comprises identification of a customer and a process at step 127. For example, the customer may be a female customer of a bank and the process may be a process configured in accordance with obtaining health insurance.

At step 128, the personalisation controller 124 extracts the customer data 109 from the customer database 108 and generates personalised content 119 at step 129.

At step 130, the user interface controller 123 generates screens 136 of the user interface 102 including with the personalised content 119 which is displayed on the user electronic device 135 at step 131.

At step 132, the data capture controller 125 captures and records user input data via a plurality of form elements 144. As alluded to above, the user input data may be transmitted to the customer database 108 for retention therein. In embodiments, the speech recognition controller may capture user input via recognising captured speech audio.

At step 133, the user interface controller decides the next screen which is then displayed in the aforedescribed manner from step 128 onwards. As alluded to above, the process 121 may comprise a plurality of branched paths and wherein the user interface controller 123 decides which path to take and therefore which user interface screens 136 to display in accordance with user input data.

After the display of a series of user interface screens 136 and capture of associated user input data, the processing 126 may proceed to fulfilment at step 134 which may include steps of updating data within the customer database 108, assessing electronic payments and/or the like.

Figure 4:
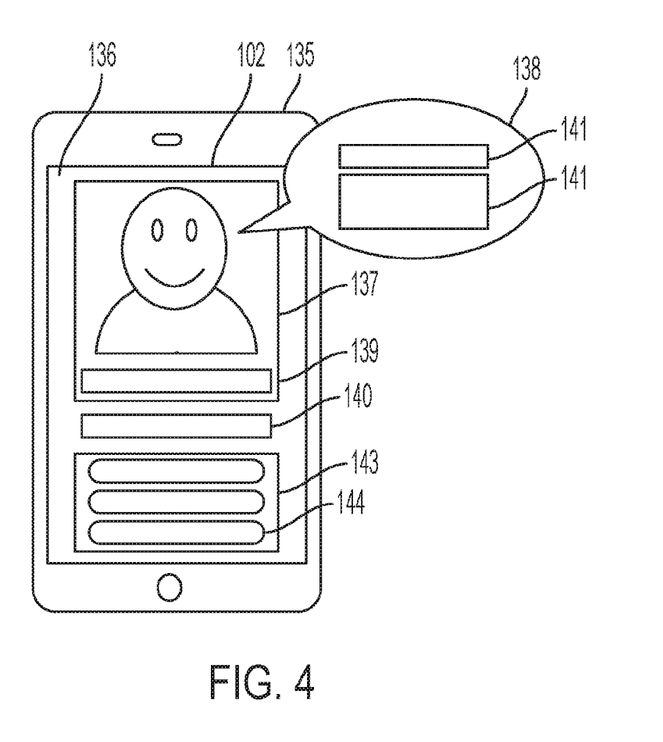
FIG. 4 shows an exemplary user interface screen generated by the system.
Figure 5:
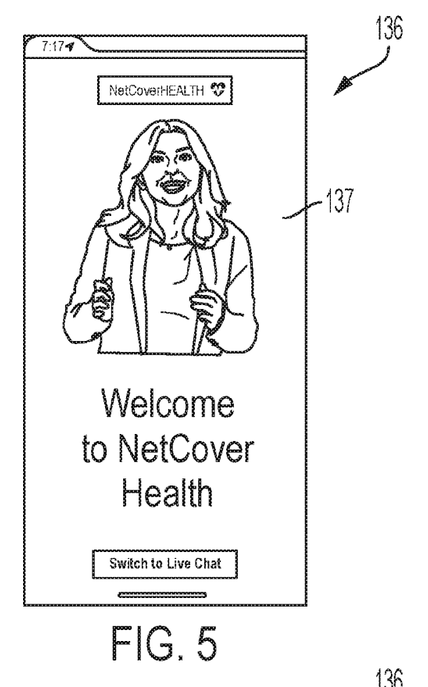
FIGS. 5-9 show an exemplary process controlled by the system.

FIG. 4 shows an exemplary user interface screen 136 of the user interface 102. The user interface 102 may be displayed by a digital display of a user electronic device 135 which, in the embodiment shown takes the form of a mobile communication device. A software application may be downloaded and installed on the electronic device 135 for the display of the interface 102. However, in alternative embodiments, the electronic device 135 executes a web browser application which browses to the website 103 served by the web server 104 wherein the user interface 102 embedded therein is displayed.

User interface screen 136 comprises an associated video file 137 embedded therein. In a preferred embodiment shown, the embedded video file 137 comprises a video of a human which is displayed with associated speech 138 which relates to information displayed on the user interface screen.

As such, the human within the embedded video file 137 may explain the various considerations in providing instructions in relation to the various information displayed on the user interface screen 136 and the various form elements 144 thereof.

As alluded to above, the user interface screen 136 may be generated by the user interface controller 123 with personalised content 119 generated by the personalisation controller 124.

In embodiments shown, personalised content 119 comprises user interface screen embedded content 140 therein. The embedded personalised content 140 may comprise text extracted from the customer database 108. For example, the text may state "Your loan application is for $1.5 million". Alternatively, the personalised content 140 may be a categorisation of data extracted from the customer database. For example, the text may state "on the basis of your income, you are eligible for a government rebate of 17%".

In embodiments, the personalised content 140 may be generated from request variables received via the interface 102. For example, a request variable may comprise a form field selection which is used by the personalisation controller 124 to generate the personalised content. For example, the personalised content 140 may comprise audio data stating "You have selected family cover". Alternatively, the personalised content 140 may be generated from request variables encoded within request variables from the interface 102. For example, a request variable from the interface 102 may encode a numerical value which may have been input into a form field. In this regard, the personalisation controller 124 may generate personalised content as synthesised audio of the numeric value.

Furthermore, the personalised content 119 may comprise video file embedded content 139. For example, the presentation controller 124 may dynamically generate a video data in accordance with customer data obtained from the customer database 108. In one manner, the video file embedded content 139 may comprise text overlay. For example, the video file displayed may comprise the text overlay stating: "Your loan application is for $1.5 million".

The personalisation controller 124 may modify the video files 120. For example, for the video file comprising the human, the personalised action controller 124 may modify the video file to overlay the text. Template video files may be stored within the content server 117 and which have text placeholders and identifiers associated with the text placeholders. As such, the personalisation controller 124 may insert text at identified text placeholders.

The personalised content 119 may further comprise audio embedded content 141. For example, the personalisation controller 124 may convert text-to-speech to play out audio stating "Your loan application is for $1.5 million".

Similarly, the personalisation controller 124 may modify the video files 120 by embedding audio. For example, for the video file 120 comprising the human associated with the user interface screen 136, the personalisation controller 124 may generate associated audio or modify audio associated therewith to insert the audio embedded content 141.

In embodiments, audio associated with the video files 120 may comprise audio placeholders. The audio placeholders may be demarcated by metadata associated with each video file 120. As such, the personalisation controller 124 inserts the audio embedded content 141 within the video audio file at the relevant place. For example, pre-recorded audio associated with the video file 120 may comprise "Your loan application is for [three second pause]". The video file 120 may be associated with meta data indicating that the loan amount placeholder is at 5.2 seconds. As such, the personalisation controller 124 may extract the loan amount from the customer database 108, transmit the parameters 118 to the content database 117 to generate personalised content 119 comprising audio verbalising the loan amount which is dynamically inserted by the personalisation controller 124 at the respective location within the video file.

The personalisation controller 124 may further modify form elements 144 of a form 143 of the user interface screen 136 in accordance with the customer data 110. For example, the personalisation controller 124 determines that a customer is not eligible for a government rebate, the personalisation controller 124 may modify the form 143 to remove the relevant input 144 associated therewith.

The personalisation controller 124 may comprise set of rules defining how the form input elements 144 are to be configured in accordance with the customer data 110. In embodiments, the form input elements 144 may be defined in HTML and associated with a series of if, then, else and/or switch statements which are used to programmatically control the generation of the HTML form 143 in accordance with customer data 110 extracted from the customer database.

Exemplary utilisation of the system 100 for virtual human health concierge shown in FIGS. 5-9.

In accordance with this example, a customer may wish to apply for health cover. The customer may have authenticated with their online banking interface whereafter they may browse to a health cover application resource.

The health cover application resource may request the interface 102 from the server 101 in accordance with the customer identifier 111.

Figure 9:
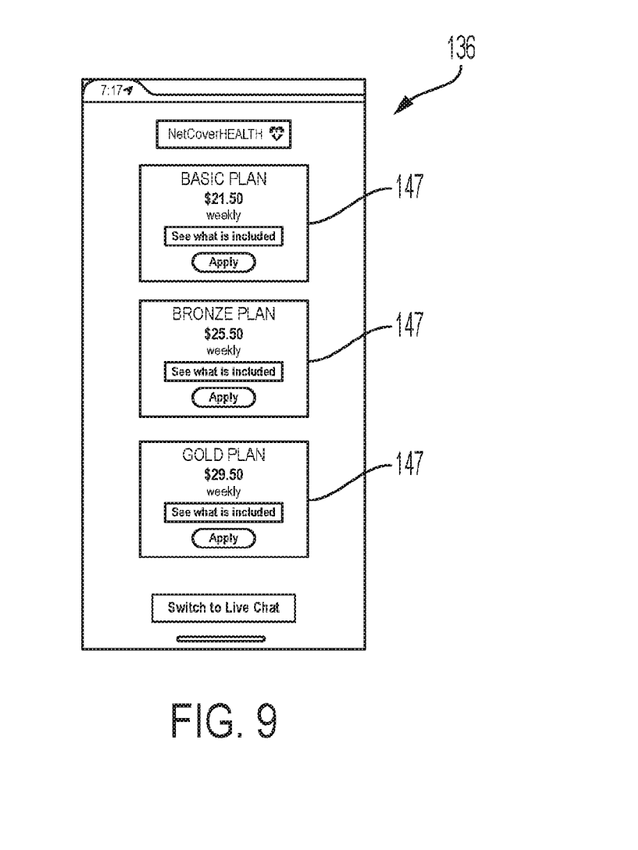

As shown in FIG. 9, the user interface screen 136 may comprise the embedded video file 137 and an indication of the process, in this case, applying for health cover.

As alluded to above, the embedded video file 137 may be personalised according to customer data 108 obtained from the customer database 108.

For example, the audio associated therewith may include the customer's name such as "Hello Sarah, I am here to help you apply for health cover". In embodiments, a male or female person video file 120 may be selected depending on the gender of the customer.

Figure 6:
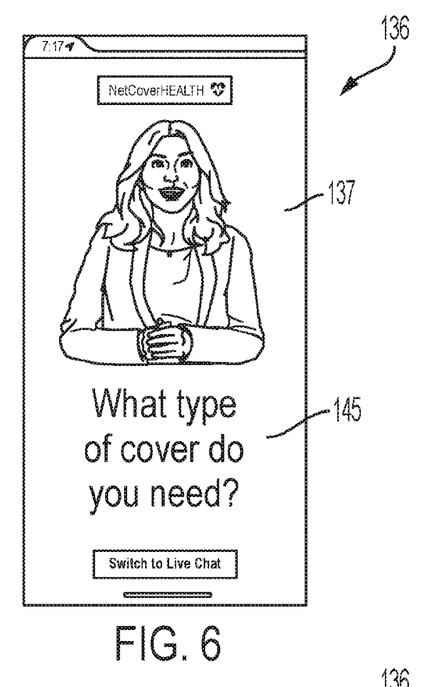
Figure 7:
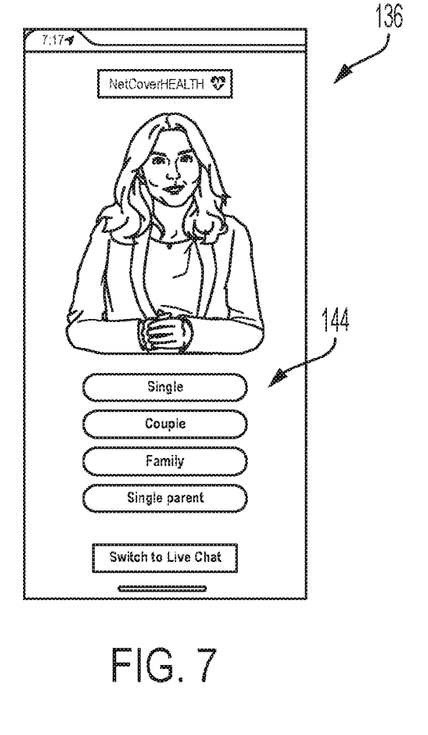

FIG. 6 shows the embedded video file 137 and associated information 145 asking what type of health cover the customer requires. As such, FIG. 7 shows the user interface screen 137 comprising a plurality of form inputs 144 each of which is selectable by the user.

In this case, each form input 144 may relate to a different type of health cover, such as health cover for a single person, couple, family and the like.

Figure 8:
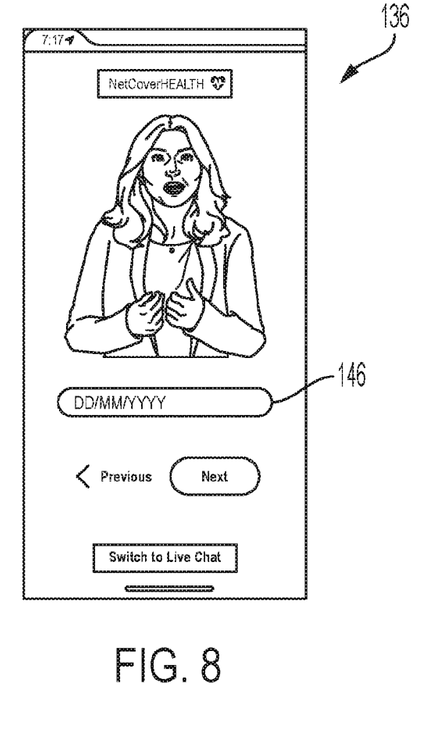

As alluded to above, the health cover process 121 may comprise a branching of paths. At this stage, the process may branch to a path depending on the type of health cover selected by the user. FIG. 8 shows the user interface screen 136 comprising a form input 146 taking the user's date of birth.

The health cover location process 121 may go through a series of the user interface screens 136 wherein the requisite data is captured.

At the completion of the process, the server 101 may update the customer database 108 with the captured data 106.

Furthermore, the server 101 may redirect to a fulfilment user interface screen 136 shown in FIG. 9 wherein a plurality of options are shown which have been generated in accordance with the customer input data. Each option may be selected to redirect to a payment processing screen.

As alluded to above, the artificial intelligence controller may be used to branch to various parts of the process 121 or to configure the user interface 136 or personalised content 119 therein. For example, the trained machine of the artificial intelligence controller may have been trained by historical user input data and training data to recognise that customers who purchase health insurance for couples often require home insurance cover. As such, in accordance with the output of the trained machine, the interface controller 123 may update the user interface 136 to include an option optional home cover insurance.

In embodiments, as opposed to using the form elements 144, the speech recognition controller may convert captured user speech audio to text. As such, the user may verbally respond to the questions posed by the user interface screens 136.

In embodiments, the server 101 may be executed on a client terminal. For example, the user may download a client-side application server 101 which is downloaded and executed by client terminal to generate the user interface.

In embodiments, as opposed to the server 101 connecting directly to a CRM 108 which would require authentication therewith, customer data variables may be obtained therefrom via an intermediary interface which are then used by the server 101 to configure the interface 102. The intermediary interface may authenticate with the CRM 108 and be configured to expose only a subset of authorised customer data fields to thereby protect customer data fields for which the server 101 is not authorised to access for the purpose of generating the interface 102.

These data variables may be encoded as URL GET request variables used to access the interface 102 (whether the interface 102 is served via a remote or local server 101) wherein the interface is configured according to these variables.

Figure 10:
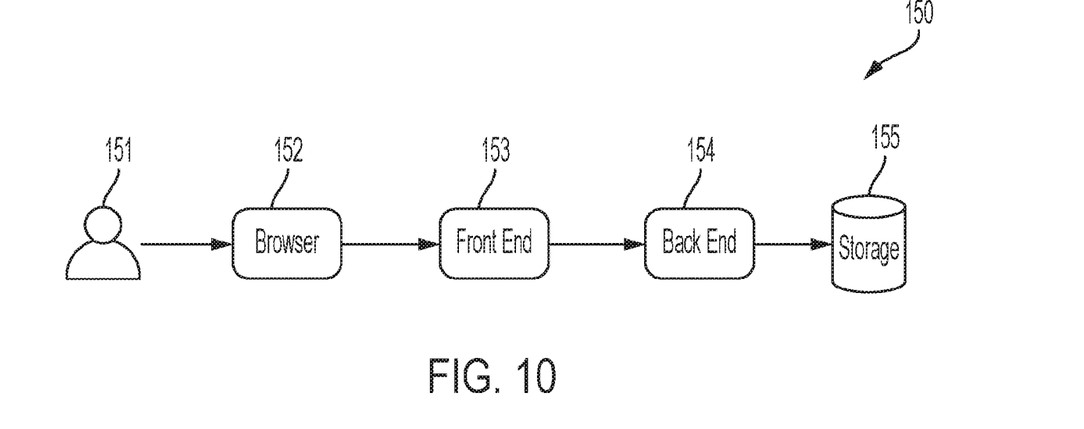
FIG. 10 shows an exemplary three tier architecture of the system in accordance with an embodiment.

An exemplary architecture 150 of the system 100 is given in FIG. 10 which uses a 3-tier architecture wherein a user 151 interacts with a front end 153 using a browser 152 and wherein the front end 153 communicates with a backend 154 having data storage 155.

Figure 11:
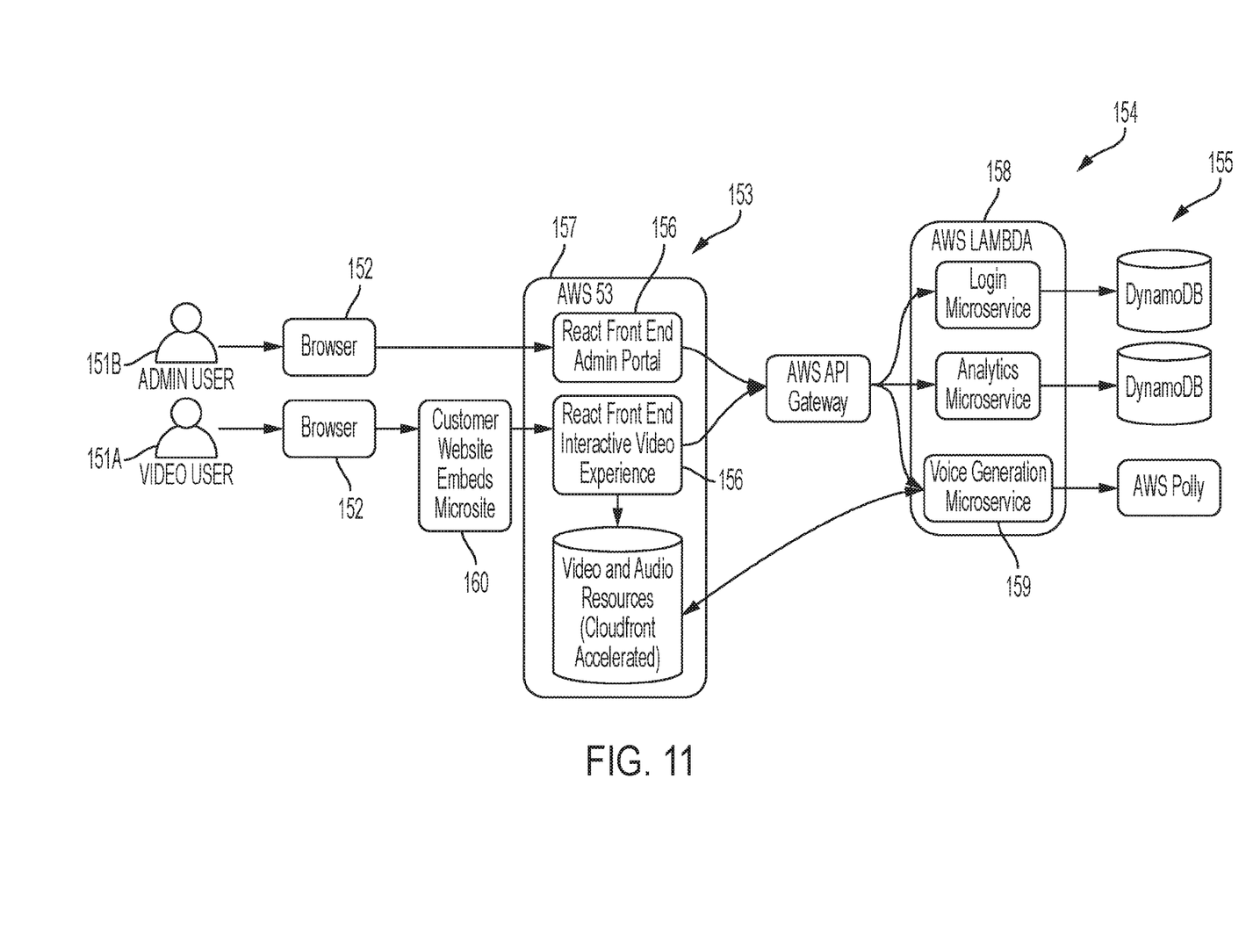
FIG. 11 shows the architecture of FIG. 10 in more detail.

As shown in FIG. 11, the front end 153 may be a single page ReactJS microsite 156. The microsite 156 may use AWS Amplify for deployment and CI/CD pipelines. As such, the microsite 156 may be built and hosted on AWS S3 157 as a static website. The backend 154 may use AWS Lambda 158 as a means to deploy microservices that perform functions like voice generation 159. There is also a storage layer 155 that consists of S3 file storage and databases.

A standard user 151A could access a third-party website 160 that the microsite 156 embedded into it. The third-party website 160 can communicate configuration and interaction information to the microsite 156 either via the window post message web API, or by supplying parameters to the URL in the iFrame used to embed the microsite. The React Front end streaming video from S3 buckets is sufficient by itself to deliver the interactive experience, but may be supported by periphery microservices that assist in tasks like voice generation and analytics.

An admin 151A user can login to a dashboard to view analytics.

Figure 12:
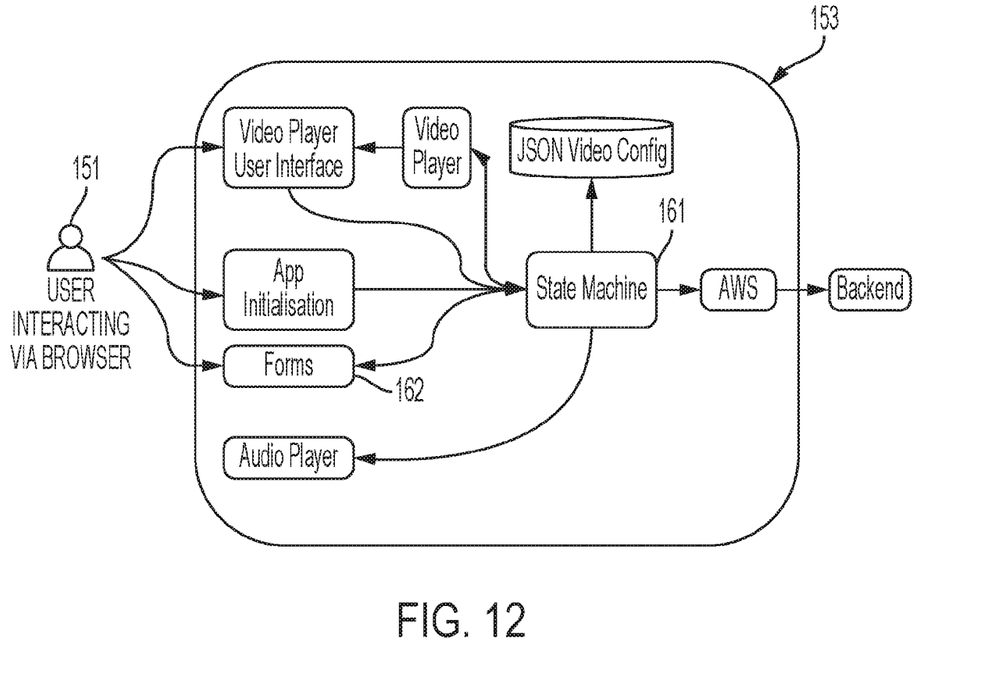
FIG. 12 shows the front-end of FIG. 10 in more detail.

As shown in FIG. 12, the front end 153 may be a ReactJS application written in JavaScript. The front end 153 may be hosted on AWS Amplify which uses S3 under the hood. AWS Amplify is a fast an inexpensive way to deploy React apps from GitHub repositories, it has enough features to run simple CI/CD and it is CDN accelerated. Whilst AWS Amplify is CDN accelerated, in practice it may not be as fast as AWS CloudFront for serving media. As such, CloudFront may be used accelerate loading times.

At the centre of the system 100 is a state machine 161 which handles stages, steps and overlays.

A stage is a separate experience rendered by the same system, so one customer may have 3 experiences that are all slightly different and so they are classed as 3 different stages in the system that are configured differently.

An overlay is a represented in FIG. 12 as the forms box 162. However, an overlay could be more than a form in being a state of the state machine 161. An overlay can be completely invisible, or it may include a form or a still image or any other web content. Whilst the state machine 161 is handling an overlay, the state machine 161 may choose to wait for input or events, or it may immediately proceed to another state.

A more complex stages may be broken down into steps, each step generally has an index and start, next and end overlays. Based in the initial step the state machine code looks for JSON configuration for proceeding steps and generates the interface accordingly.

With regards to the front and configuration, the system 100 may support three main configuration methods including query parameters wherein configuration can be supplied as query parameters to the URL. This has the advantage of being straightforward and simple, requiring no code to be written and configuration is also done prior to the experience being rendered.

Configuration may further be supported by the window.postMessage( ) WebAPI which allows for programmatic communication with the interactive video experience.

This has the advantage of being able to supply information at any time and query the interactive experience without triggering a reload. The post message API has the disadvantages of requiring code to be written, and configuration takes place once the experience has loaded.

Configuration may further supplied via a static JSON file.

With regards to query parameters, there may be two main query parameters for operation: stage and token. Other query parameters like name are exposed for testing; but it is preferable to provide configuration as in a JWT token as other parameters do not decode encoded values at this time.

| Parameter | Example Value | Description |
| --- | --- | --- |
| stage | 1 | The stage of the video, i.e. which experience to load. |
| token | eyJhbGciOiJIUzI1NilsInR5cCI6IkpXVCJ9.eyJuYW1IjoiUm9hciIslm5hbWUyljoiSHVtYW5hYmxlIn0.TJvDIK_fQBX--sXIFrgNw37D-1DB7RL1TVu7mpEoV6l | A jwt token with name and optionally name2 as contents e.g.<br>{<br>  "name": "Roar",<br>  "name2": "Humanable"<br>}<br>The algorithm used for this token was:<br>{<br>  "alg": "HS256",<br>  "typ": "JWT"<br>}<br>The decode process should support other algorithms.<br>Punctuation and spaces are supported. |
| name | Joanne | For testing the name query parameter can be supplied, it should be a single word with no punctuation or special characters |
| name2 | Michael | For testing the name query parameter can be supplied, it should be a single word with no punctuation or special characters |

The post message web API requires the experience to be ready and so in the example below it can be seen that the system listens for an isReady command to be received and then three commands are sent: hello, setStage & setConfig. Also note that the {{TEMPLATE_URL}} parameter must be replaced for all commands.

```
<body style="background-color:#41158F">
  <div style="height:400">
    <iframe id='video-concierge' src="{{TEMPLATE_URL}}?stage=1" height="400" width="400" allowtransparency="true" scrolling="false" style="border:0"></iframe>
  </div>
  <script>
    window.addEventListener("message", (event)=>{
      console.log("[Website] Received message: ", event.data.command, event);
      if (event.data.command == "isReady") {
        // get reference to window inside the iframe
```

```
            var  wn  =  document.getElementById('video-
concierge').contentWindow;
        // postMessage arguments: data to send, target origin
        wn.postMessage(
            {
                command: 'hello'
            },
            '{{TEMPLATE_URL}}'
        );
        wn.postMessage(
            {
                command: 'setConfig',
                // name: 'Roar',
                // name2: 'Humanable'
                token:
'eyJhbGciOiJIUzI1NiIsInR5cCI6IkpXVCJ9.eyJuYW11IjoiUm9hciIsIm5hbWUyIjo
iSHVtYW5hYmxlIn0.TJvDIK_fQBX--sXIFrgNw37D-1DB7RL1TVu7mpEoV6I'
            },
            '{{TEMPLATE_URL}}'
        );
        wn.postMessage(
            {
                command: 'setStage',
                stage: 1
            },
            '{{TEMPLATE_URL}}'
        );
        }
    });
</script>
</body>
```

The commands are shown as follows:

| Parameter | Example Value | Description |
|---|---|---|
| setStage | { command: 'setStage', stage: 1 } | The stage of the video, i.e. which experience to load. |
| setConfig | { command: 'setConfig', name: 'Roar', name2: 'Humanable' token: 'eyJhbGciOiJIUzI1NiIsInR5cCI6IkpXVCJ9.eyJuYW11IjoiUm9hciIsIm5hbWUyIjoiSHVtYW5hYmxlIn0.TJvDIK_fQBX--sXIFrgNw37D-1DB7RL1TVu7mpEoV6I' } | The contents of the JWT token are described in the query parameters section. If a token is supplied then other parameters will be overwritten by the contents of the token. |
| hello | { command: 'hello', } | Responds with a message containing the names supplied |
| isReady | { command: 'isReady',} | Writes to the log only |

With regards to the static JSON configuration file, the bulk of the Config for the experience may be in JSON in the videoConfig.js file. The file contains JSON with the config for each stage. The config for a simple video stage is straightforward:

| Property | Description |
|---|---|
| title | Title used by video player and can be used in UI |
| src | The initial video that the video player can preload whilst a poster image is showing. |
| poster | The location of a poster image or gif to show whilst the video is loading. |
| type | A type field that may or may not be obsolete, it gives the type of the video file for the video player. |
| initOverlay | This is the first overlay that appears, for a simple video it is set to init and just preloads the video from src and moves straight to the startOverlay |
| startOverlay | This is the second overlay that appears, for a simple video it is set to start_video and this show the poster image awaiting a click from the user to move to the next overlay |

| Property | Description |
| --- | --- |
| nextOverlay | This is the third overlay that appears, for a simple video it is set to video and this is where the video will play until completion |

The above config works for a number of scenarios; but a more complex config may be required for more complex scenarios.

| Property | Description |
| --- | --- |
| variants | Very custom overlays may specify to useCustom Variants in their config. The variant is set via the iframe/postMessage API and allows the embedding client website to choose an alternative video. This feature could be achieved by having different stages and might be better off removed to simplify. |
| initOverlay −> init_experience | If the initOverlay is set to init_experience then startOverlays will be used instead of startOverlay |
| startOverlays | Extends upon startOverlay by allowing a list of overlays to be specified with some extra data. Each entry has an index that helps workout which element of the list to goto next. |
| nextOverlays | Extends upon nextOverlay by allowing a list of overlays to be specified with some extra data. Each entry has an index that helps workout which element of the list to goto next. |
| endOverlays | Like nextOverlay and startOverlay this list has an index that helps workout which element to goto next. This step generally is used to go to a new step in the experience and so you will often see the index increment here. |

AWS Lambda was chosen for the backend, because it is very fast to implement. However, AWS Lambda does have some features that are very useful for an MVP. AWS Lambdas are not always running and so charge is per use which may be good when for a campaign that goes for a little while and then stops.

AWS Lambdas are very fast to scale. Lambdas can scale to around 1000 concurrent executions which can be increased to over 10,000 by requesting AWS support. If this is not enough then an AWS SQS Queue can be added and that queue can be configured to trigger lambdas. In general AWS lambda scaling is sufficient. It is preferential though not to wait for lambdas to complete and one way of achieving this is not waiting in the front end, and also avoiding using AWS polly.

Whereas AWS Polly may be used as a speech synthesiser for text to speech synthesis, it may not suit the present system 100. Specifically, a first approach was for AWS polly to be called from the React code to generate speech and return it as binary data to be played in the browser. However, this approach did not work for some mobile browsers. Another downside of this approach is that the credentials for AWS Polly are exposed in the React code, using environment variables does not seem to help significantly in this regard.

A better second approach for AWS Polly was implemented which has an AWS lambda that calls polly and puts the speech into an AWS S3 bucket which can then be used as a media source. This API is more secure, people can access, but it doesn't expose AWS credentials directly. The downside of this approach is that the speech contains names and financial advice in the MVP and that can be considered personally identifiable information.

For this reason, Polly should preferably not be used in an end product. Instead, names and dollar amounts that have been pre-recorded should assembled into one speech made of pre-generated parts.

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following claims and their equivalents define the scope of the invention.

The term "approximately" or similar as used herein should be construed as being within 10% of the value stated unless otherwise indicated.

The invention claimed is:

1. A digital video virtual concierge user interface system comprising a server generating the user interface, the server comprising:
   at least one process defining at least one path, the path defining a plurality of user interface definitions, wherein the at least one process creates a user interface screen for each of a plurality of steps along the path according to respective ones of the plurality of user interface definitions thereof,
   a database of a plurality of video files for at least a subset of the user interface screens,
   a processor executing computer program code instructions controllers comprising:

a user interface controller to step through the path and to generate a user interface screen for each step according to the respective user interface definition thereof, wherein at least one user interface screen comprises an associated video file embedded therein, a personalisation controller which extracts customer data from a customer database according to a customer identifier and which generates personalised content derived from the customer data and wherein the user interface controller generates at least one user interface screen in accordance with the personalised content; and a data capture controller which captures and stores user input data input via form elements of at least one of user interface screen.

2. The system as claimed in claim 1, wherein the at least one process defines a branching of more than one path and wherein the user interface controller is configured to branch to a path according to the user input data.

3. The system as claimed in claim 1, wherein, for each user interface screen, the user interface controller automatically commences playing of the associated video file.

4. The system as claimed in claim 1, wherein the video file embedded within the at least one user interface screen comprises a video of a human which is displayed and associated speech which is played and which relates to information displayed on the associate user interface screen.

5. The system as claimed in claim 1, wherein the personalisation controller generates the personalised content on-the-fly in substantial real-time.

6. The system as claimed in claim 1, wherein the personalisation controller selects pre-recorded content from the database in accordance with parameters derived from the customer data.

7. The system as claimed in claim 1, wherein the personalised content is personalised video data generated by the personalisation controller.

8. The system as claimed in claim 7, wherein the generation of the personalised video data comprises overlay text within the video data which is derived from the customer data.

9. The system as claimed in claim 8, wherein the personalisation controller modifies the video file embedded within the at least one user interface screen to overlay the text thereon.

10. The system as claimed in claim 1, wherein the personalised content is speech data generated by the personalisation controller.

11. The system as claimed in claim 10, wherein the speech data is derived from the customer data.

12. The system as claimed in claim 11, wherein the speech data is synthesised from text of the customer data.

13. The system as claimed in claim 11, wherein the speech data is synthesised from a numeric string derived from the customer data.

14. The system as claimed in claim 11, wherein the speech data is derived from categorisations of the customer data.

15. The system as claimed in claim 11, wherein the speech data is generated according to HTML request variables received from the interface.

16. The system as claimed in claim 10, wherein the personalisation controller inserts the speech data into audio data of an associated video file.

17. The system as claimed in claim 16, wherein the associated video file comprises a placeholder specified by meta data thereof and wherein the personalisation controller inserts the speech data to address the placeholder specified by the meta data.

18. The system as claimed in claim 1, wherein the personalisation controller modifies form input elements of at least one user interface screen.

19. The system as claimed in claim 1, wherein the computer program code instruction controllers further comprise a speech recognition controller which converts captured user speech audio to text.

20. The system as claimed in claim 19, wherein the data capture controller further captures and stores the text.

21. The system as claimed in claim 1, wherein the controllers further comprise an artificial intelligence controller comprising a trained machine optimised by a machine learning algorithm trained using historical user input data and wherein the trained machine is configured to output at least one of a process path selection and a user interface screen modification.

22. The system as claimed in claim 1, wherein the server is in operable communication with the content database and wherein the server transmits request parameters to the content database and receives personalised content selected therefrom.

23. The system as claimed in claim 22, wherein the speech data is generated by a speech synthesiser and wherein the speech data is stored in the content database which are accessed as a media source by the interface.

24. The system as claimed in claim 1, wherein the user interface transmits HTML request parameters to the server which are used to identify the customer.

25. The system as claimed in claim 24, wherein the HTML request parameters are URL get request parameters.

26. The system as claimed in claim 1, wherein the user interface is rendered in a web page and wherein the user interface transmits the input data to the server and receives user interface updates from the server without refreshing the web page.

27. The system as claimed in claim 26, wherein the web page is served by third-party web server and wherein the interface is embedded within the web page.

28. The system as claimed in claim 27, wherein the interface is embedded within the webpage as an iFrame.

29. The system as claimed in claim 26, wherein the user interface displays a plurality of user interface screens without refreshing the web page.

30. The system as claimed in claim 1, wherein the server authenticates with the customer database to obtain the customer data from the customer database.

31. The system as claimed in claim 30, wherein the server transmits the user input data to the customer database for updating the customer data.

32. The system as claimed in claim 1, wherein the server communicates with the customer database via an intermediary interface.

33. The system as claimed in claim 32, wherein the intermediary interface authenticates with the customer database and is configured with a set of authorised customer data fields accessible by the server.

\* \* \* \* \*